United States Patent [19]
Brown

[11] Patent Number: 5,584,582
[45] Date of Patent: Dec. 17, 1996

[54] BUMP FOIL DESIGN FOR IMPROVED DAMPING AND LOAD CAPACITY FROM COMPLIANT FOIL GAS BEARINGS

[75] Inventor: William R. Brown, Slatington, Pa.

[73] Assignee: Air Products and Chemicals, Inc., Allentown, Pa.

[21] Appl. No.: 356,604

[22] Filed: Dec. 15, 1994

[51] Int. Cl.$^6$ .................................................. F16C 17/03
[52] U.S. Cl. ...................................... 384/106; 29/898.02
[58] Field of Search ................................. 384/106, 105, 384/104, 103; 29/898.02

[56] References Cited

U.S. PATENT DOCUMENTS

| | | |
|---|---|---|
| 3,893,733 | 7/1975 | Silver et al. . |
| 4,133,585 | 1/1979 | Licht . |
| 4,167,295 | 9/1979 | Glaser . |
| 4,208,076 | 6/1980 | Gray et al. . |
| 4,213,657 | 7/1980 | Gray . |
| 4,262,975 | 4/1981 | Heshmat et al. . |
| 4,300,806 | 11/1981 | Heshmat . |
| 4,415,281 | 11/1983 | Agrawal .................................. 384/106 |

Primary Examiner—Lenard A. Footland
Attorney, Agent, or Firm—Willard Jones, II

[57] ABSTRACT

A bump foil for a compliant foil gas bearing having parallel rows of corrugations or bumps, a first series of bumps of equal height spaced equidistant from one another and a second series of bumps of a lesser height with each bump of the second series disposed between bumps of said first series. The bump foil can be fabricated from metals having a thickness greater than that of conventional bump foils to increase load capacity of the gas bearing without sacrificing compliance required for Coulomb damping.

11 Claims, 2 Drawing Sheets

BUMP FOIL DESIGN FOR IMPROVED DAMPING AND LOAD CAPACITY FROM COMPLIANT FOIL GAS BEARINGS

FIELD OF THE INVENTION

The present invention pertains to the bump foil used in compliant foil film bearings and more particularly to compliant bump foils used in compliant hydrodynamic compliant foil gas bearings.

BACKGROUND OF THE INVENTION

High speed turbo machinery, e.g., turbo-expanders, is used in a variety of industrial applications such as in the production of industrial gases the fractional distillation of air. Fractional distillation of air is used to produce oxygen, nitrogen, argon, and the like. In these processes, turbo expanders are used to reduce the pressure of the air and/or the individual gases components.

Compliant foil gas bearings have been applied successfully to a wide range of high speed rotating machinery. These gas foil-type bearings are especially attractive to turbo expanders because they eliminate the lube oil system, simplify the seal gas system, simplify the control system, offer lower frictional power loss and provide greater flexibility of machine installation.

U.S. Pat. No. 3,893,733; 4,133,585; 4,167,295; 4,262,975; and 4,300,806 are examples of compliant foil gas (hydrodynamic) bearings. The prior art compliant hydrodynamic bearings rely upon a bump foil and a smooth foil which are fastened to the inside surface of a journal bearing. The bump foil has a series of uniform corrugations (bumps) which are aligned generally parallel to the longitudinal axis of the sleeve. In the past, attempts have been made to change the configuration of the bump foil in order to improve the load carrying capacity without sacrificing compliance required for Coulomb damping of the sleeve bearings.

SUMMARY OF THE INVENTION

A new bump foil design for use with a conventional three pad compliant foil gas bearing has been discovered that will allow thicker bump foils which in turn permits increased load capacity for the sleeve bearing without sacrificing the compliance required for Coulomb damping. According to the present invention, the new bump foil has a series of generally parallel bumps or corrugations having a generally arc-shaped cross section, which are aligned parallel to the axis of rotation. The bumps (corrugations) have two different heights measured from a flat surface when the bump foil is placed thereon. A first series of corrugations (bumps) of the same height, measured when the bump foil is placed on a flat surface, are created in a piece of bump foil material. Disposed between each of said first series of corrugations is a second series of corrugations (bumps) having a height that is generally between one half and ninety-five percent that of its neighbors so that when the shaft is operating under a light load it is supported by the first series or taller bumps, or 50% of the total bump foil support structure. Thus, the new bump foil operating under light loads will be more compliant. As the load increases, the tall bumps will deflect allowing the shorter bumps (second series) to support the load for increased stiffness and load capacity.

DETAILED DESCRIPTION OF THE INVENTION

Figure 1:
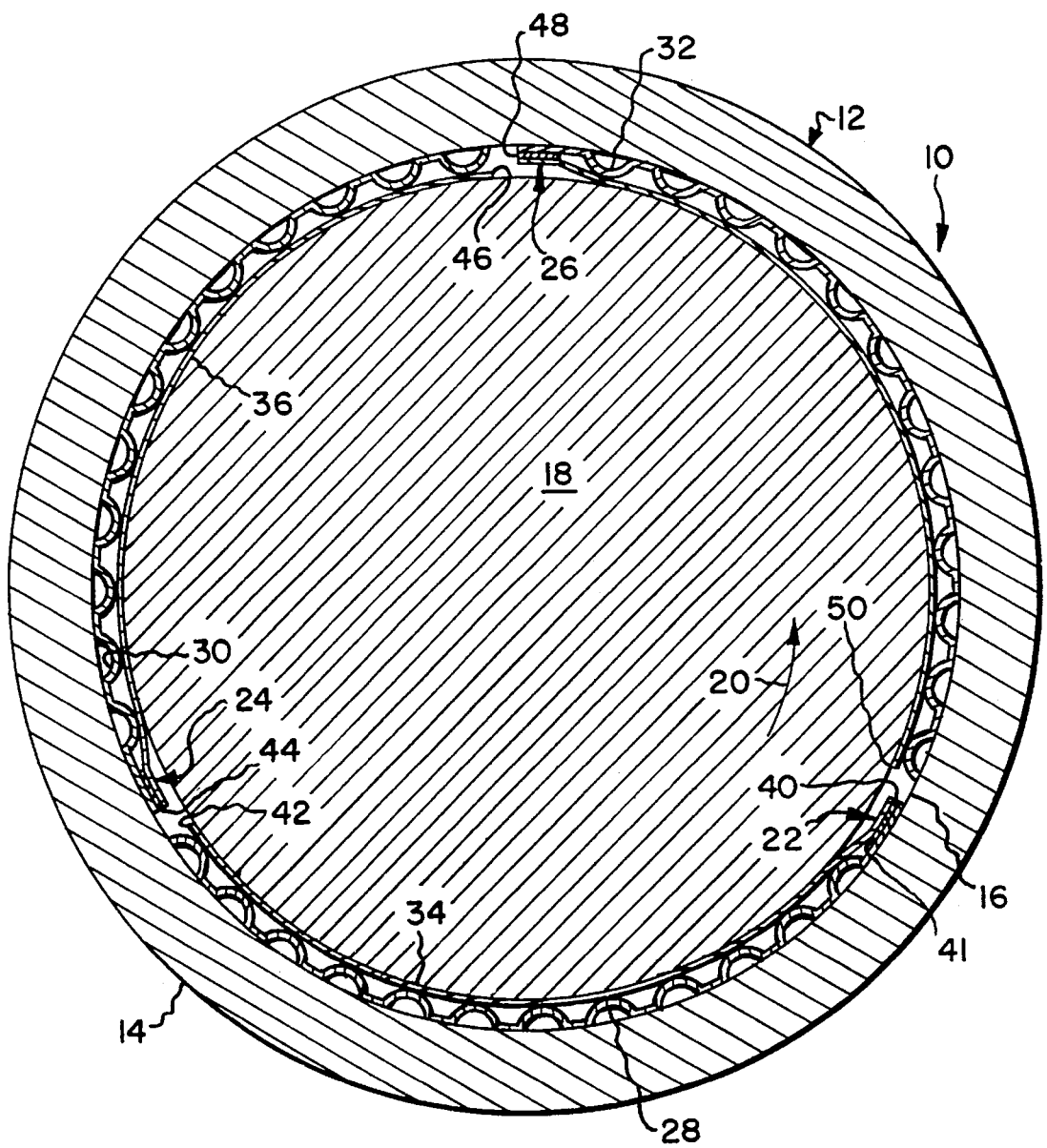
FIG. 1 is a cross-sectional view of a three pad compliant foil gas bearing according to the prior art.

Referring to FIG. 1, a conventional three pad compliant gas bearing assembly is shown generally as 10. Foil gas bearing assembly 10 includes a journal sleeve or bushing 12 having a generally cylindrical shape with an outer surface 14 and an inner surface 16. Outer surface 14 can contain key ways and slots (not shown) to facilitate installation of the bearing assembly 10 into a turbo machine. Foil gas bearing assembly 10 supports a shaft 18 mounted for rotation in the direction shown by arrow 20. Disposed inside of the sleeve 12 are three bump foil assemblies 22, 24, and 26, consisting of bump foils 28, 30, and 32 covered by a flat foil 34, 36, and 38. Referring to bump foil assembly 22, the bump foil 28 is first welded to the inner surface 16 of sleeve 12 by a series of spot welds placed transversely inside of the sleeve 12 along the first or fixed end 40 of bump foil assembly 22 as is well known in the art. As shown in FIG. 1, a spacer (shown as 41 with assembly 22) is spot welded on top of the bump foil 28 where it is welded to the shell 12. A first or fixed end of the flat foil 34 is then spot welded to the spacer 41 at the same location. Thus, the bump foil assembly 28 includes a first or fixed end 40 and a second or free end 42. Neither the bump foil 28 nor the smooth foil 30 are otherwise fixed to the sleeve 12 and are free to move from the fixed end toward the free end 42 under rotation of the shaft 18. Bump foil assembly 24 has a similar fixed end 44 and a free end 46, and bump foil assembly 26 has a fixed end 48 and a free end 50.

Figure 2A:
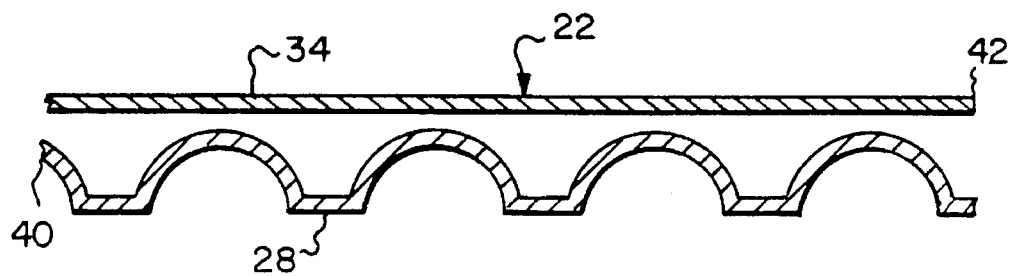
FIG. 2a is a schematic representation of a bump foil according to the prior art under a no-load condition.

As shown in FIG. 2a, when the bump foil assembly 22 is first installed the bumps on bump foil 28 are of a uniform cross section, each having an identical height.

Figure 2B:
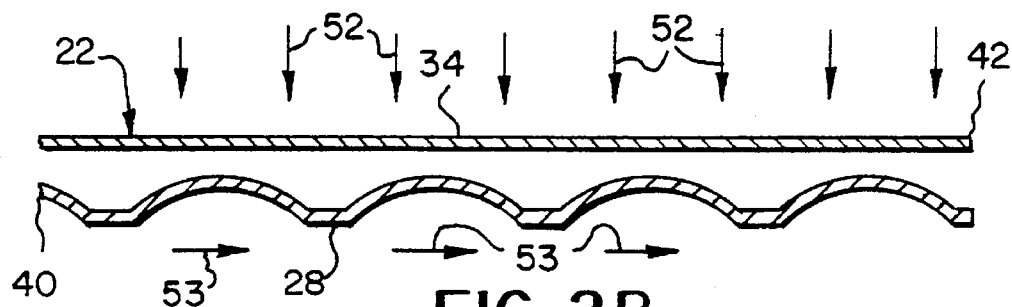
FIG. 2b is a schematic representation of a bump foil according to the prior art shown under conditions of a shaft load.

As shown in FIG. 2b, when a rotational load is placed on the shaft, which is shown by arrows 52, the bump foil 28 deflects in the direction of the arrows 53 from the fixed end 40 to the free end 42 of the bump foil assembly 22. At the same time the bump foil 28 elongates, the smooth foil 34 can also elongate depending upon the load.

Figure 3A:
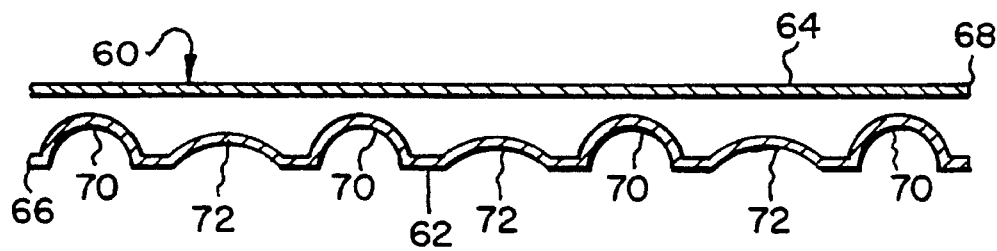
FIG. 3a is a schematic representation of a bump foil according to the present invention under a no load condition.

Referring to FIG. 3a, there is shown a new bump foil assembly 60 having a bump foil 62 and a smooth foil 64. Bump foil 62 is fixed to the sleeve by a weld at the first or fixed end 66 as is known in the prior art. Bump foil 62 has a first series of bumps or corrugations 70 which are of a set height. Bump foil 62 includes a second series of bumps disposed between each of the first series of bumps which are of a height that is approximately 70–95% of the height of the bumps or corrugations 70.

Figure 3B:
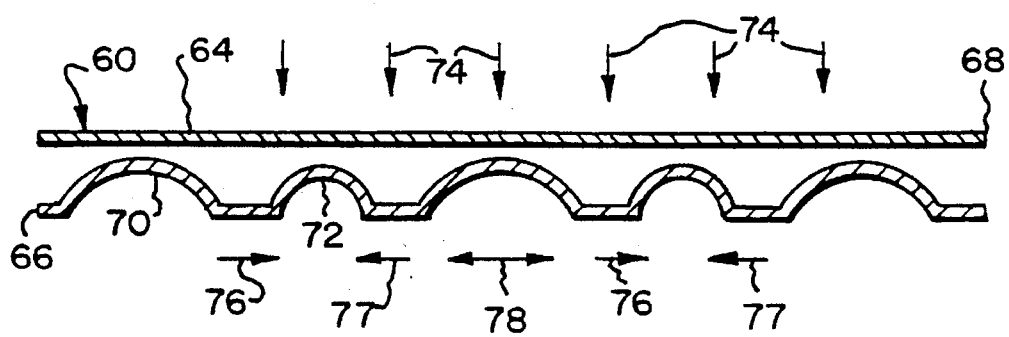
FIG. 3b is a schematic representation of a bump foil according to the present invention under conditions of a shaft load.

As shown in FIG. 3b, when a load, as shown by arrows 74, is placed on the bump foil assembly 60, the bump foil 62 is free to move in two directions, as shown by arrows 76, 77, and 78. Alternating the bump height allows the bump foil to deflect in two directions for increased damping of the bump foil. As the load increases, all of the bumps will support the load resulting in increased load capacity and stiffness. Bump foils according to the present invention, can be made of conventional materials such as nickel alloys sold under the tradename Inconel. Prior art bump foils are made from flat stock approximately 0.003 inches thick. Bump foils, according to the present invention, can be fabricated from similar materials but with increased thickness. The new bump foil geometry allows for thicker bump foils for higher load capacity without sacrificing compliance required for Coulomb damping. For example, a prior art bearing system using a 0.003 inch thick bump foil can be replaced with a bump foil according to the invention that has a minimum thickness of 0.0035 inches. It is contemplated that, depending upon the size of the bearing, the bump foil will have a thickness between 0.002 and 0.012 inches. Coulomb damping is provided by the bump foils sliding motion as the load is applied and removed as shown in FIGS. 2b and 3b. The bump foil geometry having two different bump heights results in light loads being supported only by the taller bumps (70) or 50% of the total bump foil structure. Therefore, under light loads, the new bump foil will be more compliant. As the load increases the tall bumps 70 will deflect allowing the shorter bumps 72 to support the load for increased stiffness and load capacity.

The damping characteristics of the new gas foil bearings using the new bump foil design is provided by the sliding motion of the bump foil as the load is applied and removed. The bump foil designed according to the present invention permits sliding motion in two directions and is independent of load angle. This is a significant improvement over the prior art foil designs where a load applied to the free end of the bump foil assembly could lock the bump foils in place restricting motion and damping.

Past designs used two bump foils having different spring constants mounted in series (nested configuration). The bump foil motion would still be restricted if the load is applied to the free end of the pad which in turn will reduce the damping capacity of the bearing.

The bump foil of the present invention permits increased stiffness with increased load without sacrificing compliance of the gas foil bearing to provide Coulomb damping.

Having thus described my invention what is desired to be secured by Letters Patent of the United States is set forth in the appended claims.

What is claimed is:

1. A bump foil for use in a compliant foil gas bearing assembly comprising:
    a thin elongated metal foil having a longitudinal axis;
    a first series of bumps of equal height in said foil placed transverse to said axis, said first series of bumps having a generally semi-circular shaped cross section and spaced equidistant from one another; and
    a second series of bumps in said foil placed transverse to said axis, said second series of bumps having a generally semi-circular shaped cross-section and positioned so that a second bump is between each of said first bumps, both bumps convex in the same direction the radius of said second series of bumps measured when said bump foil is placed on a flat surface being 50 to 90 percent of the radius of said first series of bumps, said bump foil having a generally flat surface extending between each of said first and second bumps.

2. A bump foil according to claim 1 wherein said metal is nickel based alloy.

3. A bump foil according to claim 1 wherein the height of each of said second series of bumps is from 70 to 95% of the height of said first series of bumps.

4. A bump foil according to claim 1 wherein the metal foil prior to formation of the bumps has a thickness of from about 0.002 to about 0.012 inches.

5. A bump foil according to claim 1 wherein said first series of bumps is arranged so that a first bump is proximate an end of said foil that is adapted to be fastened to a sleeve when fabricating a compliant foil gas bearing.

6. In a compliant foil gas bearing of the type consisting of a generally cylindrical journal sleeve housing having at least three bump foil assemblies disposed approximately 120° apart on an inner surface of said housing, each of said bump foil assemblies having a metal bump foil and a smooth metal foil having a spacer therebetween on an end fixed to said sleeve and a free end extending to a location proximate a fixed end of an adjacent bump foil assembly, the improvement comprising:
    each of said bump foils having a first series of bumps of equal height in said bump foil placed transverse to said axis, said first series of bumps having a generally semi-circular shaped cross section and spaced equidistant from one another; and
    a second series of bumps in said foil placed transverse to said axis, said second series of bumps having a generally semi-circular shaped cross-section and positioned so that a second bump is between each of said first bumps, both bumps convex in the same direction the radius of said second series of bumps measured when said bump foil is placed on a flat surface being less than the radius of said first series of bumps, said bump foil having a generally flat surface extending between each of said first and second bumps.

7. A compliant foil gas bearing according to claim 6 wherein said metal is a nickel based alloy.

8. A compliant foil gas bearing according to claim 6 wherein the height of each of said second series of bumps is from 70 to 95% of the height of said first series of bumps.

9. A compliant foil gas bearing according to claim 6 wherein the metal prior to formation of the bumps has a thickness from about 0.002 to 0.012 inches.

10. A compliant foil gas bearing according to claim 6 wherein said first series of bumps is arranged so that a first bump is proximate an end of said foil that is adapted to be fastened to said sleeve when fabricating a compliant foil gas bearing.

11. A method of increasing the load capacity and coulomb damping characteristics of a three pad bump foil type compliant foil gas bearing comprising:
    replacing each of the bump foils with a thin elongated metal foil having a longitudinal axis manufactured by:
    creating a first series of bumps of equal height in said foil placed transverse to said axis, said first series of bumps having a generally semi-circular cross-sectional shape and spaced equidistant from one another; and
    creating a second series of bumps in said foil placed transverse to said axis, said second series of bumps having a generally semi-circular shaped cross-section and positioned so that a second bump is between each of said first bumps, both bumps convex in the same direction the radius of said second series of bumps measured when said bump foil is placed on a flat surface being 50 to 95 percent of the radius of said first series of bumps, and creating a generally flat surface extending between each of said first and second bumps.

* * * * *

UNITED STATES PATENT AND TRADEMARK OFFICE
CERTIFICATE OF CORRECTION

PATENT NO. : 5,584,582
DATED : Dec. 17, 1996
INVENTOR(S) : William R. Brown

It is certified that error appears in the above-indentified patent and that said Letters Patent is hereby corrected as shown below:

Column 4, Line 31
  Delete "less than" and substitute therefore -- 50 to 95 percent of --

Signed and Sealed this

First Day of April, 1997

Attest:

BRUCE LEHMAN

Attesting Officer    Commissioner of Patents and Trademarks